US012110712B2

(12) United States Patent
Li

(10) Patent No.: US 12,110,712 B2
(45) Date of Patent: Oct. 8, 2024

(54) COMBINATION LOCK

(71) Applicant: XIAMEN MAKE SECURITY TECHNOLOGY CO., LTD., Fujian (CN)

(72) Inventor: Yijian Li, Xiamen (CN)

( * ) Notice: Subject to any disclaimer, the term of this patent is extended or adjusted under 35 U.S.C. 154(b) by 367 days.

(21) Appl. No.: 17/782,666

(22) PCT Filed: Dec. 27, 2019

(86) PCT No.: PCT/CN2019/129348
§ 371 (c)(1),
(2) Date: Jun. 6, 2022

(87) PCT Pub. No.: WO2021/128311
PCT Pub. Date: Jul. 1, 2021

(65) Prior Publication Data

US 2023/0022564 A1 Jan. 26, 2023

(51) Int. Cl.
*E05B 37/00* (2006.01)
*E05B 37/02* (2006.01)

(52) U.S. Cl.
CPC ...... *E05B 37/0079* (2013.01); *E05B 37/0034* (2013.01); *E05B 37/0048* (2013.01); *E05B 37/02* (2013.01)

(58) Field of Classification Search
CPC ............. E05B 37/0079; E05B 37/0034; E05B 37/0048; E05B 37/02; E05B 37/041; E05B 37/0041; E05B 37/04; E05B 37/0075; E05B 37/0031; E05B 37/0055; E05B 17/145; E05B 27/005; E05B 29/004
USPC ........................................................... 70/289
See application file for complete search history.

(56) References Cited

U.S. PATENT DOCUMENTS 7,958,757 B1 * 6/2011 Lee ....................... E05B 13/103 70/284
10,851,563 B1 * 12/2020 Zhang ................. E05B 37/0034
2009/0107193 A1 * 4/2009 Lee ..................... E05B 37/0034 70/284
2012/0186313 A1 * 7/2012 Yang ....................... E05C 3/042 70/284
2017/0114567 A1 * 4/2017 Taylor ................. E05B 37/0058
2017/0356217 A1 * 12/2017 Simpson .............. B65D 55/145
2020/0024866 A1 * 1/2020 Hartmann ........... E05B 37/0058
2023/0049472 A1 * 2/2023 Ramakrishna ........ E05B 37/025

(Continued)

FOREIGN PATENT DOCUMENTS

CN 204609512 U * 9/2015 ......... E05B 37/0034
CN 110374406 A * 10/2019 ............. E05B 15/00
EP 2942457 A1 * 11/2015 ........... E05B 13/103

*Primary Examiner* — Kristina R Fulton
*Assistant Examiner* — James Edward Ignaczewski

(57) ABSTRACT

Disclosed is a combination lock, comprising a rotatable knob capable of relative rotation, a panel, a bolt, and a dial assembly. The dial assembly comprises a base having a movement chamber, a dial shaft, multiple sets of bushings and dials, a position resetting mechanism, a positioning member, and a protection frame The rotatable knob can be rotated relative to the panel to a first position, second position, third position, or fourth position, so as to achieve locking, automatic password resetting, automatic dial position resetting, and manual password setting. The combination lock uses one-time temporary passwords, thereby achieving superior security performance.

21 Claims, 15 Drawing Sheets

(56) References Cited

U.S. PATENT DOCUMENTS

2023/0127631 A1* 4/2023 Li ........................... E05B 37/02
70/314

* cited by examiner

COMBINATION LOCK

BACKGROUND OF THE INVENTION

1. Field of the Invention

The present invention relates to a lock, and more particularly to a combination lock.

2. Description of the Prior Art

A combination lock has the convenience of an electronic code lock and the stability of a mechanical lock, so it is widely used. In general, the password of a conventional combination lock on the market is unchanged between resets.

Combination locks are not suitable for applications in places with frequent population movements, such as lockers in shopping malls, bathhouses and other places. When the combination lock unlocked and locked, the correct password is displayed, and the user needs to actively scramble the password to prevent the password from being exposed. It is inconvenient in operation.

SUMMARY OF THE INVENTION

The primary object of the present invention is to provide a combination lock, which has the functions of automatic password resetting and automatic dial positioning resetting, so as to improve the safety and convenience of the product.

In order to achieve the above-mentioned object, the solutions of the present invention are described below.

A combination lock comprises a rotatable knob that is rotatable relative to a panel, a bolt, and a dial assembly. The rotatable knob has an accommodation chamber. The panel is pivotally connected to the accommodation chamber. The bolt is mounted to a side wall of the accommodation chamber. The dial assembly includes a base, a dial shaft, a plurality of sets of bushings and dials, a position resetting mechanism, a positioning member, and a protection frame. The base is mounted to the panel and located in the accommodation chamber. The dial shaft passes through a movement chamber of the base and is movable axially relative to the movement chamber, in cooperation with the bolt to realize unlocking and locking. The bushings are sleeved on the dial shaft, and are selectively stationary or rotatable relative to the dial shaft along with axial movement of the dial shaft. The dials are disposed corresponding to the bushings, and selectively rotate together with the bushings or rotate relative to the bushings. The position resetting mechanism is configured to reset the dials. The positioning member is mounted to the base and disposed opposite to the dials for restricting resetting of the dials. The protection frame is mounted to the base and is movable axially relative to the base, for changing the dials to rotate together with the bushings or to rotate relative to the bushings. Relative rotation of the rotatable knob and the panel drives the dial shaft and the protection frame to move axially and enables the positioning member to restrict or unlock rotation of the dials so that the rotatable knob can be rotated relative to the panel to a first position, a second position, a third position, or a fourth position. In the first position, the dial shaft cannot move and is mutually restricted with the bolt. When a password is correct, the bushings can rotate relative to the dial shaft, the dials can rotate together with the bushings, and the positioning member restricts resetting of the dials. In the second position, the bushings are stationary relative to the dial shaft, the dials can rotate relative to the bushings, and the positioning member doesn't restrict resetting of the dials, so as to achieve automatic password resetting. In the third position, the bushings can rotate relative to the dial shaft, the dials can rotate together with the bushings, and the positioning member doesn't restrict resetting of the dials, so as to achieve automatic dial position resetting. In the fourth position, the bushings are stationary relative to the dial shaft, the dials can rotate relative to the bushings, and the positioning member restricts resetting of the dials, so as to achieve manual password setting.

The position resetting mechanism further includes dial magnets and a resetting magnet. The dial magnets are disposed corresponding to the dials. The resetting magnet is configured to attract the dial magnets for resetting the dials.

The dial magnets are arranged in pairs. The dial magnets with opposite poles are disposed on each dial. The resetting magnet is arranged along an axial direction of the dial shaft and is mounted to the dial shaft.

The position resetting mechanism further includes an acceleration magnet. The acceleration magnet is mounted to the base and is arranged in parallel with the resetting magnet.

An outer circumference of the dial shaft has a plurality of first raised blocks. The bushings correspond to the first raised blocks one by one. An inner wall of each of the bushings is formed with a first engaging groove opposite to a corresponding one of the first raised blocks. The corresponding first raised block is movably fitted in the first engaging groove along with axial movement of the dial shaft.

An outer circumference of each of the bushings has a plurality of restricting protrusions arranged at equal intervals. An inner wall of each of the dials has restricting grooves corresponding in position to the restricting protrusions. The restricting protrusions are movably fitted in the restricting grooves.

A side wall of the movement chamber is formed with dial grooves corresponding to the respective dials. The dial grooves are configured to make way for the dials to rotate and prevent the dials from moving axially in the movement chamber.

The dial assembly further includes a dial shaft spring and a protection frame spring disposed at one end of the dial shaft, away from the bolt, to provide an elastic force for the dial shaft and the protection frame to move axially. The dial assembly further includes a spring mounting seat. The spring mounting seat is disposed between the end of the dial shaft away from the bolt and the side wall of the accommodation chamber. Both the dial shaft spring and the protection frame spring are mounted to the spring mounting seat.

Both ends of the protection frame are sleeved on the dial shaft and abut against the bushings at both ends of an inner side of the protection frame, so that the protection frame can drive the bushings to move.

The first position, the fourth position, the second position and the third position are arranged in sequence, so that the rotatable knob is rotated relative to the panel to achieve functions of unlocking, automatic password resetting and manual password setting in turn when unlocked and to achieve a function of automatic dial position resetting when locked.

The combination lock further comprises a bolt spring. The side wall of the accommodation chamber has a rotation rail. The bolt is mounted at one end of the rotation rail and is movable in a direction perpendicular to the rotation rail. The bolt spring is disposed between the bolt and a bottom of the accommodation chamber. One end of the dial shaft is movably fitted between both ends of the rotation rail. One end of the rotation rail, close to the bolt, is defined as the first position. The other end of the rotation rail, away from the bolt, is defined as the third position.

Two sides of the bolt have an unlocking slope and a locking slope, respectively. The unlocking slope faces an unlocking direction of the dial shaft, so that the bolt provides a component force for moving the dial shaft axially along with rotation of the rotatable knob. The locking slope faces a locking direction of the dial shaft, so that the dial shaft provides a component force for lowering the bolt along with rotation of the rotatable knob.

The combination lock further comprises an upper rail, a lower rail and a rail spring installed on the side wall of the accommodation chamber. The upper rail and the lower rail are arranged opposite to each other to form the rotation rail. An inner side of the upper rail has a first receiving groove for the protection frame to move axially. A slide slope is connected between the first receiving groove and the inner side of the upper rail. The slide slope is disposed between the first position and the second position. The lower rail is disposed opposite to the first receiving groove. The rail spring is disposed between the lower rail and the bottom of the accommodation chamber. One end of the lower rail, close to the bolt, has a press slope. When the protection frame is moved axially to lean against the press slope, the lower rail presses down the rail spring to make way for the protection frame.

An outer circumference of the lower rail has a second raised block. An inner wall of the accommodation chamber has a second engaging groove. The second raised block is inserted into the second engaging groove to restrict circular movement of the lower rail on the inner wall of the accommodation chamber.

The dial assembly further includes a positioning member spring. The positioning member is pivotally connected to the base. One side of the positioning member has pawls corresponding to the dials. A third engaging groove is defined between every adjacent two of code words of each of the dials. The pawls are opposite to the third engaging grooves of the dials, respectively. The positioning member spring is disposed between another side of the positioning member and the base to provide an elastic force to drive the positioning member to rotate for the pawls to be engaged in the third engaging grooves of the dials, respectively. A bottom of the accommodation chamber has an unlocking lug. The unlocking lug is opposite to the other side of the positioning member. The positioning member movably cooperates with the unlocking lug along with rotation of the rotatable knob. When the positioning member is in contact with the unlocking lug, the pawls are disengaged from the third engaging grooves of the dials. The unlocking lug is located between the second position and the third position.

The combination lock further comprises a lock cylinder and a link assembly. The lock cylinder is mounted to the panel and inserted in the accommodation chamber. The link assembly is disposed at an inner end of the lock cylinder and is opposite to the bolt. When a correct key is inserted in the lock cylinder, the lock cylinder is rotated to drive the bolt to move through the link assembly, so as to unlock the dial shaft.

The link assembly includes a push block and a drive block. The push block is slidably fitted at a bottom of the accommodation chamber and is movable along a circumferential direction of the accommodation chamber. The push block has a second receiving groove to make way for the rail spring. The drive block is mounted to the inner end of the lock cylinder and configured to drive the push block to move along with rotation of the lock cylinder.

One end of the push block, close to the bolt, has a first downward pressing slope. The first downward pressing slope faces the bolt and is inclined toward the bottom of the accommodation chamber to provide a component force for pressing the bolt downward. The bolt has a second downward pressing slope opposite to the first downward pressing slope. The first downward pressing slope is slidably fitted with the second downward pressing slope.

The dial assembly further includes a probe member. The probe member is pivotally connected to the base. One side of the probe member has a plurality of probes corresponding to the respective bushings. Each of the bushings has a probe groove corresponding to a corresponding one of the probes. When the lock cylinder is rotated, the drive block drives the probe member to rotate for the probes to be in contact with surfaces of the respective bushings. When the password is correct, the probes are inserted into the probe grooves of the bushings, respectively.

The combination lock further comprises a bottom plate and a lock member. A locking end of the rotatable knob has a rotating shaft. The bottom plate has a shaft hole. The rotating shaft passes through the shaft hole and is connected to the lock member. The bottom plate is connected to the panel.

The panel has at least one connecting post. A bottom of the accommodation chamber is formed with an arc-shaped hole. The connecting post is fitted in the accommodation chamber and passes through the arc-shaped hole. When the rotatable knob is rotated relative to the panel, the arc-shaped hole is configured to make way for circular movement of the connecting post. A top end of the connecting post is connected to the bottom plate.

With the above solutions, in the present invention, the bushings and the dials are separated during the relative rotation of the rotatable knob and the panel by providing the protection frame, in cooperation with the resetting magnet and the dial magnets to realize automatic password resetting. The product is a one-time temporary password each time it is used. The product uses one-time temporary password every time it is used. The password is set by the user, which reduces the risk that the password is exposed and lost. Besides, the resetting magnet and the dial magnets also have the function of automatic dial position resetting, which can prevent the user from forgetting to scramble the password when the lock is locked Finally, the product of the present invention has the functions of automatic password resetting and automatic dial position resetting when locked, is suitable for places with large population flow, is easy to manage, and has high safety performance.

DETAILED DESCRIPTION OF THE PREFERRED EMBODIMENTS

Figure 1:
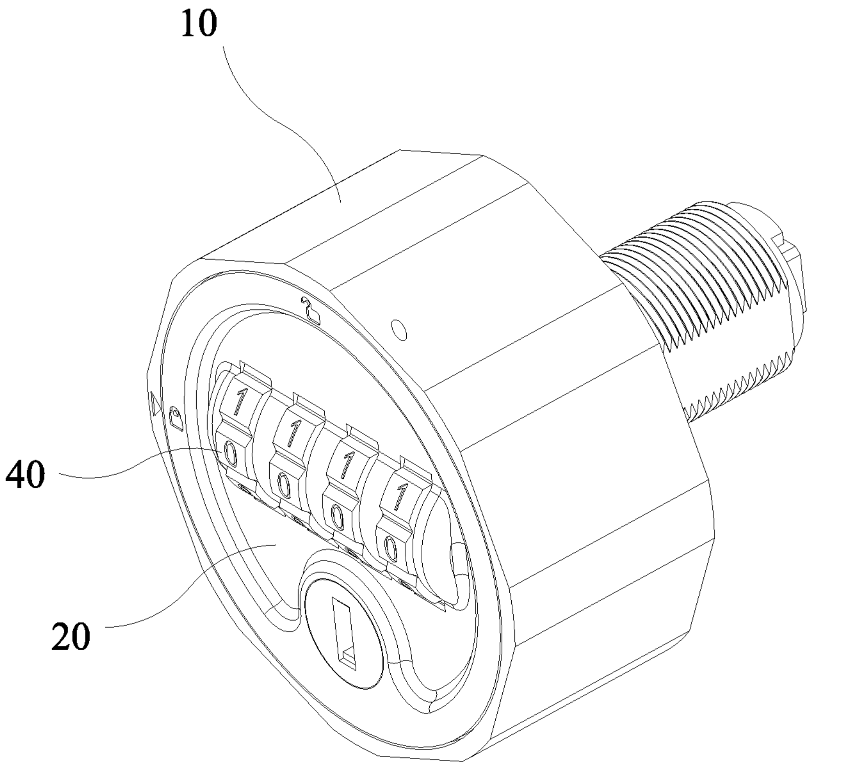
FIG. 1 is a perspective view of a preferred embodiment of the present invention.
Figure 2:
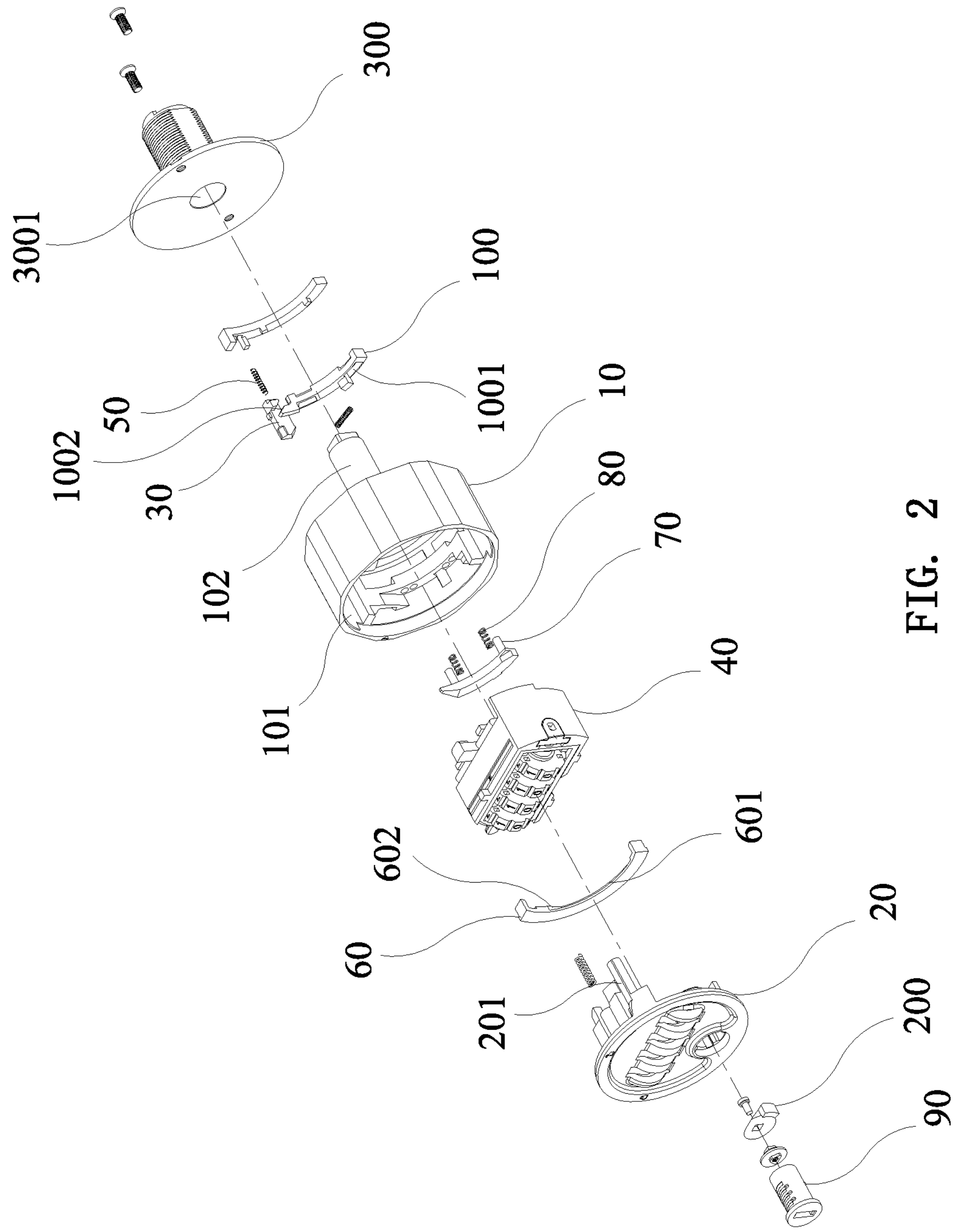
FIG. 2 is an exploded view of the preferred embodiment of the present invention.
Figure 3:
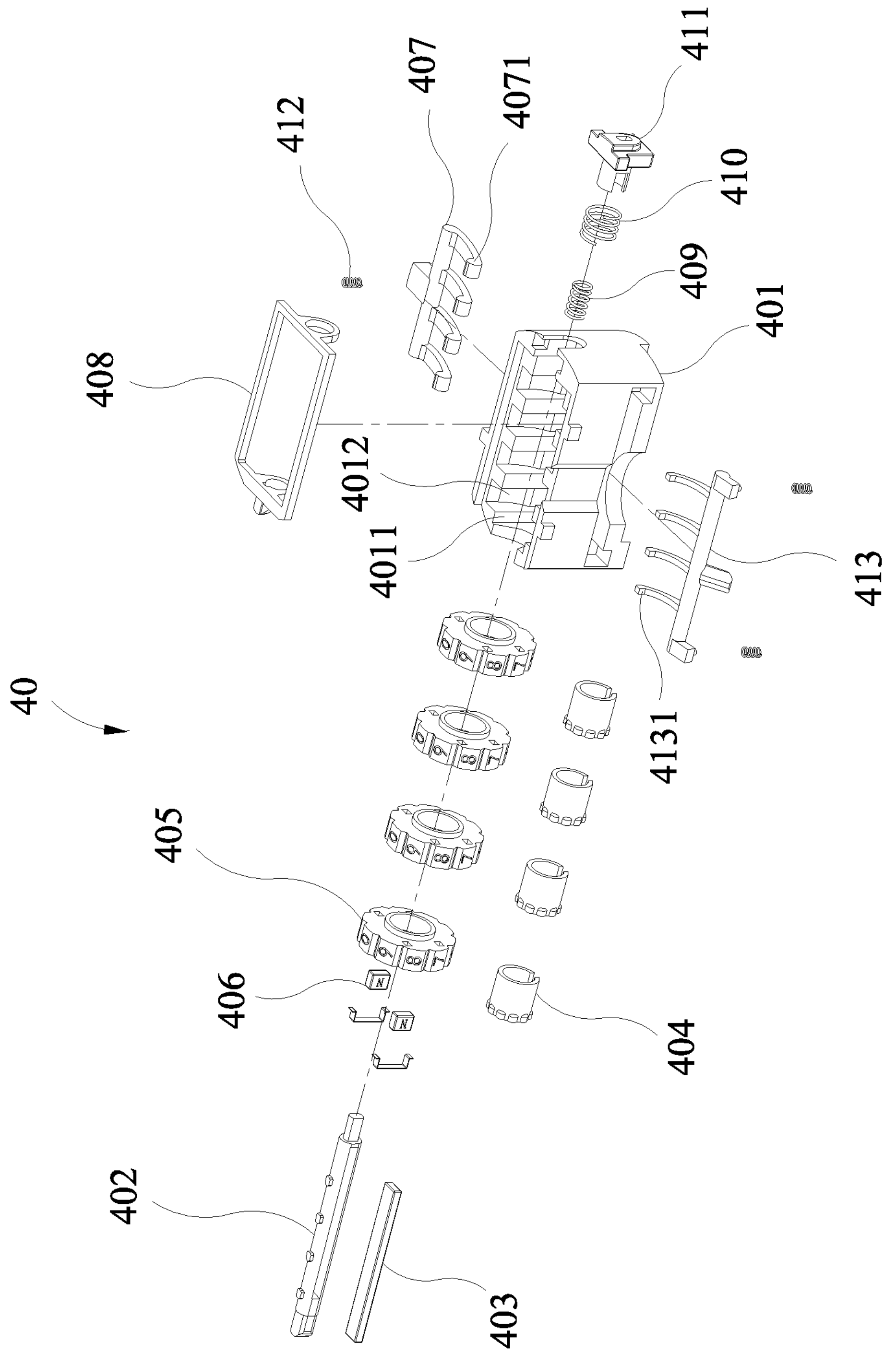
FIG. 3 is an exploded view of the dial assembly of the preferred embodiment of the present invention.
Figure 4:
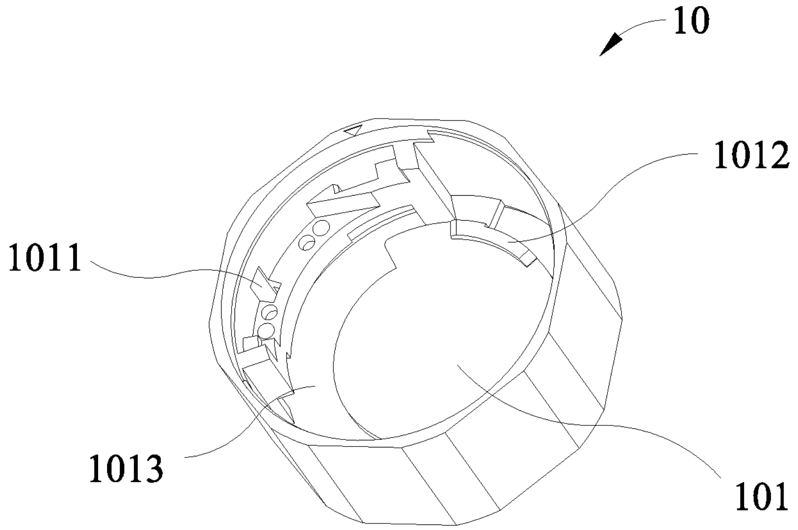
FIG. 4 is a perspective view of the rotatable knob of the preferred embodiment of the present invention.
Figure 5:
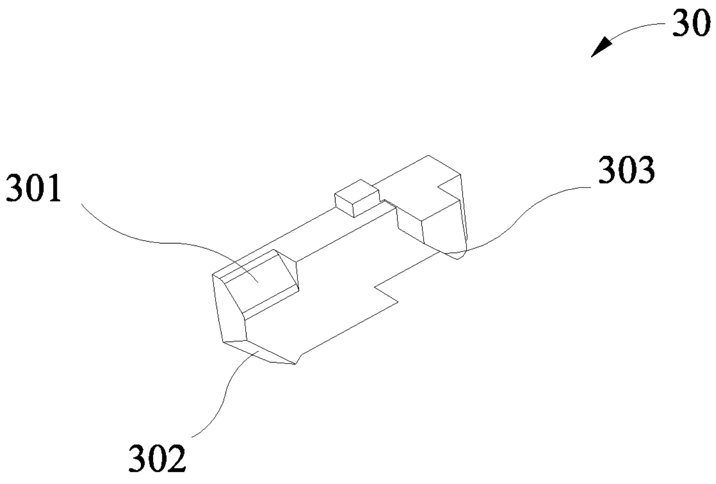
FIG. 5 is a perspective view of the bolt of the preferred embodiment of the present invention.
Figure 6:
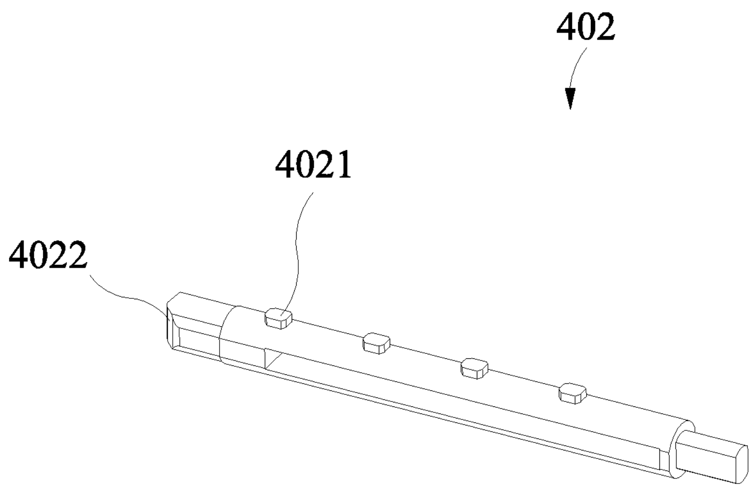
FIG. 6 is a perspective view of the dial shaft of the preferred embodiment of the present invention.
Figure 7:
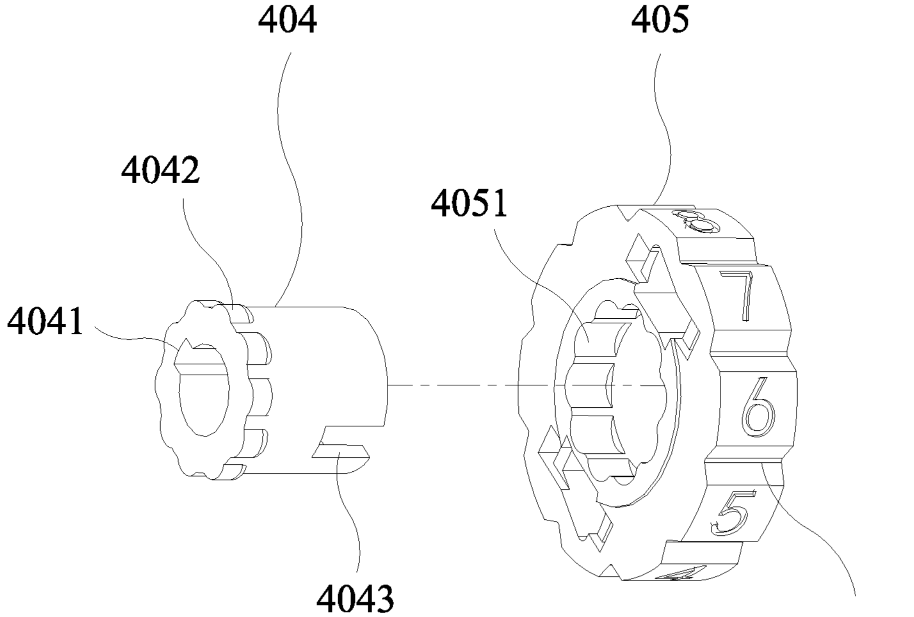
FIG. 7 is a perspective view of the dial and the bushing of the preferred embodiment of the present invention.
Figure 8:
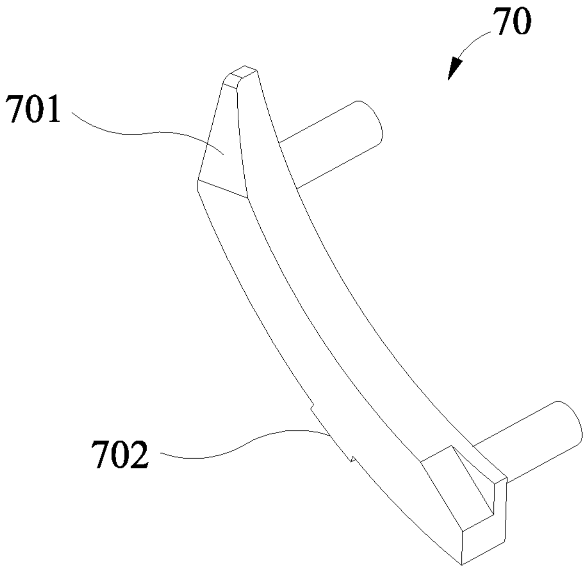
FIG. 8 is a perspective view of the lower rail of the preferred embodiment of the present invention.
Figure 9:
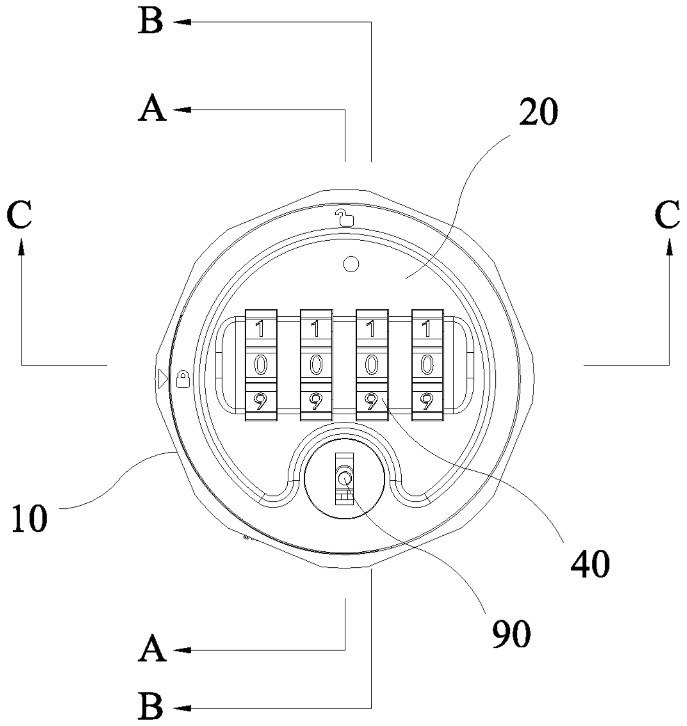
FIG. 9 is a front view of the preferred embodiment of the present invention in an initial state.
Figure 10:
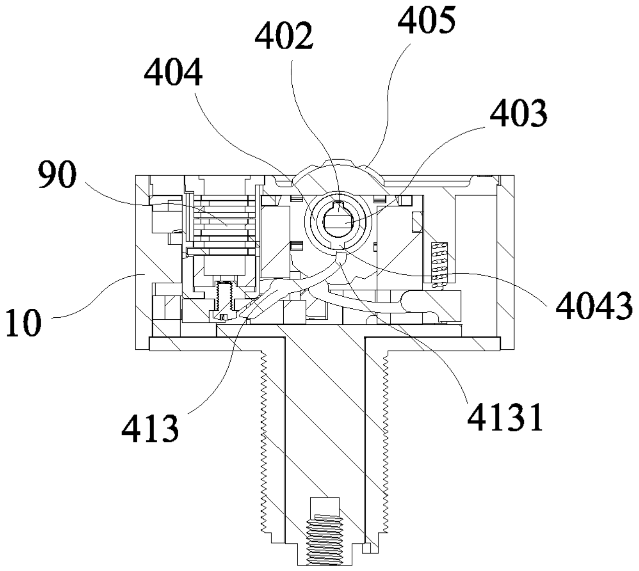
FIG. 10 is a cross-sectional view taken along line A-A of FIG. 9.
Figure 11:
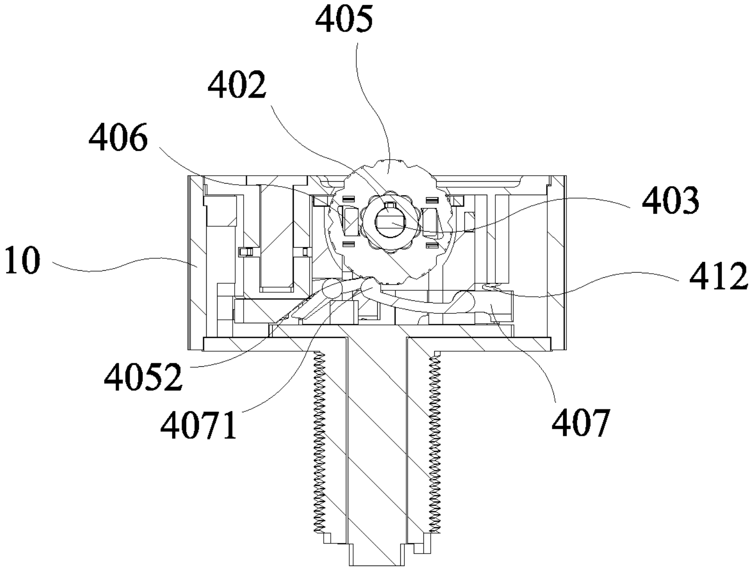
FIG. 11 is a cross-sectional view taken along line B-B of FIG. 9.
Figure 12:
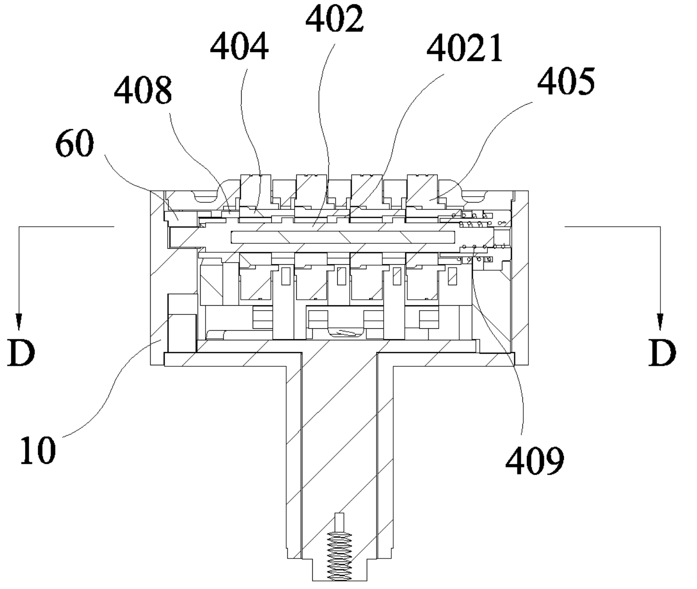
FIG. 12 is a cross-sectional view taken along line C-C of FIG. 9.
Figure 13:
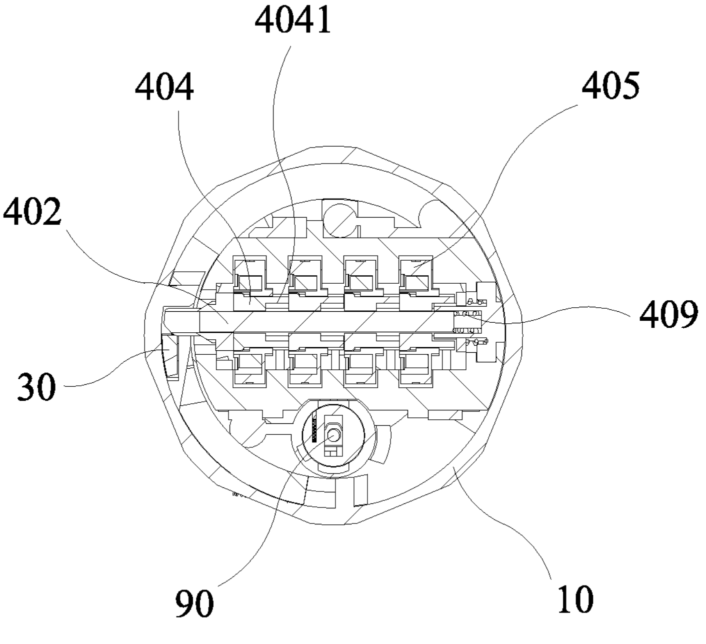
FIG. 13 is a cross-sectional view taken along line D-D of FIG. 12.

Embodiments of the present invention will now be described, by way of example only, with reference to the accompanying drawings.

The present invention discloses a combination lock, comprising a rotatable knob 10 that is rotatable relative to a panel 20, a bolt 30, and a dial assembly 40.

The rotatable knob 10 has an accommodation chamber 101 therein.

The panel 20 is pivotally fitted at the opening of the accommodation chamber 101.

The bolt 30 is mounted to the side wall of the accommodation chamber 101.

The dial assembly 40 comprises a base 401 having a movement chamber 4011, a dial shaft 402, a resetting magnet 403, multiple sets of bushings 404, dials 405 and dial magnets 406, a positioning member 407, and a protection frame 408. The base 401 is mounted to the panel 20 and located in the accommodation chamber 101. The dial shaft 402 passes through the movement chamber 4011 and is movable along an axial direction of the movement chamber 4011. One end of the dial shaft 402 is disposed opposite to the bolt 30 to realize unlocking and locking. The resetting magnet 403 is mounted to the dial shaft 402. The bushings 404 are sleeved on the dial shaft 402 and can be selectively stationary or rotatable relative to the dial shaft 402 along with the axial movement of the dial shaft 402. The dials 405 are disposed corresponding to the bushings 404 and can selectively rotate together with the bushings 404 or rotate relative to the bushings 404. The dial magnets 406 are disposed corresponding to the dials 405. The positioning member 407 is mounted to the base 401 and disposed opposite to the dials 405 to restrict the dials 405 from rotating due to the mutual attraction between the resetting magnet 403 and the dial magnets 406. The protection frame 408 is mounted to the base 401 and is movable along the axial direction of the base 401, so that the bushings 404 move relative to the dials 405 to change the cooperation relationship between the bushings 404 and the dials 405. The relative rotation of the rotatable knob 10 and the panel 20 drives the dial shaft 402 and the protection frame 408 to move along the axial direction of the base 401 and enables the positioning member 407 to restrict or unlock rotation of the dials 405. The rotatable knob 10 can be rotated relative to the panel 20 to a first position, a second position, a third position, or a fourth position.

In the first position, the dial shaft 402 cannot move and is mutually restricted with the bolt 30. When the password is correct, the bushings 404 can rotate relative to the dial shaft 402, the dials 405 can rotate together with the bushings 404, and the positioning member 407 restricts the rotation of the dials 405.

In the second position, the bushings 404 are stationary relative to the dial shaft 402, the dials 405 can rotate relative to the bushings 404, and the positioning member 407 unlocks the rotation of the dials 405, so as to achieve automatic password resetting.

In the third position, the bushings 404 can rotate relative to the dial shaft 402, the dials 405 can rotate together with the bushings 404, and the positioning member 407 unlocks the rotation of the dials 405, so as to achieve automatic dial position resetting;

In the fourth position, the bushings 404 are stationary relative to the dial shaft 402, the dials 405 can rotate relative to the bushings 404, and the positioning member 407 restricts the rotation of the dials 405, so as to achieve manual password setting.

FIGS. 1 to 13 illustrate the specific embodiments of the present invention. The accommodation chamber 101 is disposed at one end of the rotatable knob 10, and the other end of the rotatable knob 10 is a locking end.

The dial magnets 406 are arranged in pairs. The dial magnets 406 with opposite poles are disposed on each dial 405.

The dial assembly 40 further includes an acceleration magnet (not shown in the figure). The acceleration magnet is mounted to the base 401 and arranged in parallel with the resetting magnet 403 to increase the magnetic force for achieving the rapid resetting of the dials 405.

The outer circumference of the dial shaft 402 has a plurality of first raised blocks 4021. The bushings 404 correspond to the first raised blocks 4021 one by one. The inner wall of each bushing 404 is formed with a first engaging groove 4041 opposite to the corresponding first raised block 4021. The corresponding first raised block 4021 is movably fitted in the first engaging groove 4041 along with the axial movement of the dial shaft 402. Normally, the first raised block 4021 and the first engaging groove 4041 are misaligned in the circumferential direction of the dial shaft 402. That is, the bushings 404 and the dial shaft 405 cannot perform relative axial movement, and they can only move relative to each other when the dials 405 are in a state that the password is correct, that is, the dial shaft 405 can move axially.

The outer circumference of each bushing 404 has a plurality of restricting protrusions 4042 arranged at equal intervals. The inner wall of each dial 405 has restricting grooves 4051 corresponding in position to the restricting protrusions 4042. The restricting protrusions 4042 are movably fitted in the restricting grooves 4051 to achieve a spline fit between the bushings 404 and the dials 405. When the password is to be set (manually or automatically), the restricting protrusions 4042 are disengaged from the restricting grooves 4051, that is, the bushings 404 and the dials 405 are rotatable relative to each other. After the password is set, the restricting protrusions 4042 are engaged in the restricting grooves 4051 so that the bushings 404 and the dials 405 are relatively stationary, which ensures that only the code words of the correct password on the dials 405 correspond to the first engaging grooves 4041 of the bushings 404.

The side wall of the movement chamber 4011 is formed with dial grooves 4012 corresponding to the respective dials 405. The dial grooves 4012 are configured to make way for the dials 405 to rotate and prevent the dials 405 from moving axially in the movement chamber 4011.

The dial assembly 40 further includes a dial shaft spring 409 and a protection frame spring 410 disposed at the other end of the dial shaft 402, thereby providing an elastic force for the dial shaft 402 and the protection frame 408 to move axially.

The dial assembly 40 further includes a spring mounting seat 411. The spring mounting seat 411 is disposed between the other end of the dial shaft 402 and the side wall of the accommodation chamber 101. Both the dial shaft spring 409 and the protection frame spring 410 are mounted to the spring mounting seat 411. By providing the spring mounting seat 411, the positioning and installation of the dial shaft spring 409 and the protection frame spring 410 is realized, and it is ensured that the dial shaft spring 409 and the protection frame spring 410 do not interfere with the relative rotation of the panel 20 and the rotatable knob 10.

Both ends of the protection frame 408 are sleeved on the dial shaft 402 and abut against the bushings 404 at both ends of the inner side of the protection frame 408, so that the protection frame 408 can drive the bushings 404 to move.

The first position, the fourth position, the second position and the third position are arranged in sequence, so that the rotatable knob 10 is rotated relative to the panel 20 to achieve the functions of unlocking, automatic password resetting and manual password setting in turn when unlocked and to achieve the function of automatic dial position resetting when locked.

The present invention further includes a bolt spring 50. The side wall of the accommodation chamber 101 has a rotation rail (not shown in the figure). The bolt 30 is mounted at one end of the rotation rail and is movable in a direction perpendicular to the rotation rail. The bolt spring 50 is disposed between the bolt 30 and the bottom of the accommodation chamber 101. One end of the dial shaft 402 is movably fitted between both ends of the rotation rail. One end of the rotation rail, close to the bolt 30, is defined as the first position, and the other end of the rotation rail, away from the bolt 30, is defined as the third position.

Two sides of the bolt 30 have an unlocking slope 301 and a locking slope 302, respectively. The unlocking slope 301 faces the unlocking direction of the dial shaft 402 so that the bolt 30 provides a component force for moving the dial shaft 402 axially along with the rotation of the rotatable knob 10. The locking slope 302 faces the locking direction of the dial shaft 402, so that the dial shaft 402 provides a component force for lowering the bolt 30 along with the rotation of the rotatable knob 10. One end of the dial shaft 402 may have a guide slope 4022 corresponding to the unlocking slope 301 and the locking slope 302 to ensure smoother relative movement of the dial shaft 402 and the bolt 30.

The present invention further includes an upper rail 60, a lower rail 70 and a rail spring 80 installed on the side wall of the accommodation chamber 101. The upper rail 60 and the lower rail 70 are arranged opposite to each other to form the rotation rail. The inner side of the upper rail 60 has a first receiving groove 601 for the protection frame 408 to move axially. A slide slope 602 is connected between the first receiving groove 601 and the inner side of the upper rail 60. The slide slope 602 is disposed between the first position and the second position. The lower rail 70 is disposed opposite to the first receiving groove 601. The rail spring 80 is disposed between the lower rail 70 and the bottom of the accommodation chamber 101. One end of the lower rail 70, close to the bolt 30, has a press slope 701. When the protection frame 408 is moved axially to lean against the press slope 701, the lower rail 70 presses down the rail spring 80 to make way for the protection frame 408.

The outer circumference of the lower rail 70 has a second raised block 702. The inner wall of the accommodation chamber 101 has a second engaging groove 1011. The second raised block 702 is inserted into the second engaging groove 1011 to restrict the circular movement of the lower rail 70 on the inner wall of the accommodation chamber 101, so as to ensure the functional stability of the lower rail 70.

The dial assembly 40 further includes a positioning member spring 412. The positioning member 407 is pivotally connected to the base 401. One side of the positioning member 407 has pawls 4071 corresponding to the dials 405. A third engaging groove 4052 is defined between every adjacent two of code words of the dial 405. The pawls 4071 are opposite to the third engaging grooves 4052 of the dials 405, respectively. The positioning member spring 412 is disposed between the other side of the positioning member 407 and the base 401 to provide an elastic force to drive the positioning member 407 to rotate for the pawls 4071 to be engaged in the third engaging grooves 4052 of the dials 405, so as to restrict the rotation of the dials 405 due to the mutual attraction between the positioning resetting magnet 403 and the dial magnets 406. The bottom of the accommodation chamber 101 has an unlocking lug 1012. The unlocking lug 1012 is opposite to the other side of the positioning member 407. The positioning member 407 movably cooperates with the unlocking lug 1012 along with the rotation of the rotatable knob 10. When the positioning member 407 is in contact with the unlocking lug 1012, the pawls 4071 are disengaged from the third engaging grooves 4052 of the dials 405. The unlocking lug 1012 is located between the second position and the third position.

The present invention further includes a lock cylinder 90 and a link assembly. The lock cylinder 90 is mounted to the panel 20 and inserted in the accommodation chamber 101. The link assembly is disposed at the inner end of the lock cylinder 90 and is opposite to the bolt 30. When a correct key is inserted in the lock cylinder 90, the lock cylinder 90 is rotated to drive the bolt 30 to move through the link assembly, so as to unlock the dial shaft 402.

The link assembly includes a push block 100 and a drive block 200. The push block 100 is slidably fitted at the bottom of the accommodation chamber 101, and is movable along the circumferential direction of the accommodation chamber 101. The push block 100 has a second receiving groove 1001 to make way for the rail spring 80. The drive block 200 is mounted to the inner end of the lock cylinder 90 and configured to drive the push block 100 to move along with the rotation of the lock cylinder 90.

One end of the push block 100, close to the bolt 30, has a first downward pressing slope 1002. The first downward pressing slope 1002 faces the bolt 30 and is inclined toward the bottom of the accommodation chamber 101 to provide a component force for pressing the bolt 30 downward. The bolt 30 has a second downward pressing slope 303 opposite to the first downward pressing slope 1002. The first downward pressing slope 1002 is slidably fitted with the second downward pressing slope 303.

The dial assembly 40 further includes a probe member 413. The probe member 413 is pivotally connected to the base 401. One side of the probe member 413 has a plurality of probes 4131 corresponding to the respective bushings 404. Each bushing 404 has a probe groove 4043 corresponding to a corresponding one of the probes 4131. When the lock cylinder 90 is rotated, the drive block 200 drives the probe member 413 to rotate for the probes 4131 to be in contact with the surfaces of the bushings 404. When the dials 405 are turned until the password is correct, the probes 4131 are inserted into the probe grooves 4043 of the bushings 404, so that the key can be used in conjunction with the turning of the dials 405 to look for the set password.

The present invention further includes a bottom plate 300 and a lock member (not shown in the figure). The locking end of the rotatable knob 10 has a rotating shaft 102. The bottom plate 300 has a shaft hole 3001. The rotating shaft 102 passes through the shaft hole 3001 and is connected to the lock member. The bottom plate 300 is connected to the panel 20. The bottom plate 300 can realize the installation of the product on the opening and closing parts, such as cabinet doors, when in use.

The panel 20 has at least one connecting post 201. The bottom of the accommodation chamber 101 is formed with an arc-shaped hole 1013. The connecting post 201 is fitted in the accommodation chamber 101 and passes through the arc-shaped hole 1013. When the rotatable knob 10 is rotated relative to the panel 20, the arc-shaped hole 1013 is configured to make way for the circular movement of the connecting post 201. The top end of the connecting post 201 is connected to the bottom plate 300. The arc length of the arc-shaped hole 1013 determines the rotatable angle between the panel 20 and the rotatable knob 10. In this embodiment, the top end of the connecting post 201 is locked to the bottom plate 300 by screws.

The functions that can be achieved by the present invention are explained below through the structural changes of the present invention.

Initial state: FIGS. 9 to 13 illustrate the initial state of the present invention (that is, the locked state set under normal circumstances). Due to the function of automatic dial position resetting of the present invention (referring to the following function explanation) or the user manually scrambles the password, the password is incorrect. The first raised blocks 4021 of the dial shaft 402 are not aligned with the first engaging grooves 4041 of the bushings 404, so the dial shaft 402 cannot be extended and retracted (the dial shaft 402 is always in an extended state under the action of the dial shaft spring 409). When the rotatable knob 10 is rotated, the dial shaft 402 is stuck at the position of the bolt 30, and the product is in a locked state. At the same time, the protection frame 408 cannot move axially due to the restriction of the upper rail 60, so that the bushings 404 and the dials 405 are relatively stationary and can rotate relative to the dial shaft 402. The positioning member spring 412 drives the positioning member 407 to rotate so that the pawls 4071 are engaged in the third engaging grooves 4052 to restrict the rotation of the dials 405 due to the mutual attraction between the resetting magnet 403 and the dial magnets 406. The user turns the dials 405 to input the correct password. When the password is input, the dials 405 will not be reset automatically to cause invalid input. The lock cylinder 90 is in a default state without a key inserted. The probes 4131 of the probe member 413 are disengaged from the probe grooves 4043, so as not to interfere with the rotation of the bushings 404.

Figure 14:
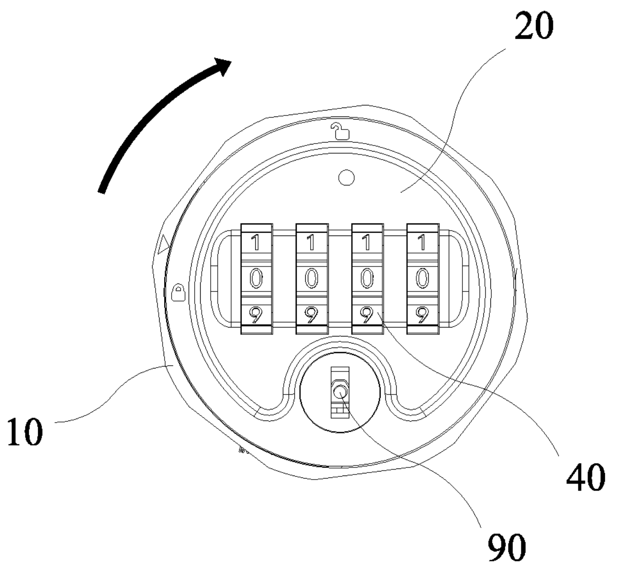
FIG. 14 is a front view of the preferred embodiment of the present invention in an unlocked state.
Figure 15:
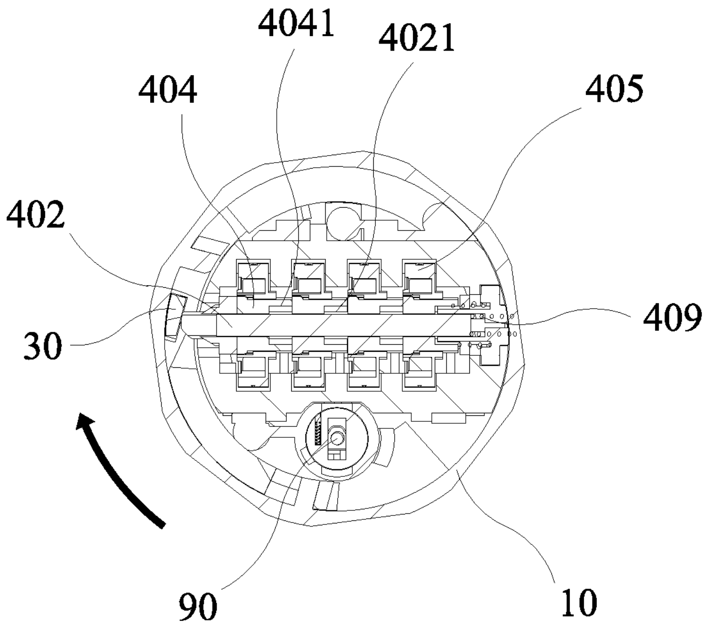
FIG. 15 is a structural schematic view of the preferred embodiment of the present invention in an unlocked state.

Unlocking: As shown in FIG. 14 and FIG. 15, when the password is correct, the first raised blocks 4021 of the dial shaft 402 are aligned with the first engaging grooves 4041 of the bushings 404. The dial shaft 402 can be extended and retracted. When the rotatable knob 10 is rotated, the bolt 30 presses the dial shaft 402 to retract (the first raised blocks 4021 are inserted in the first engaging grooves 4041), so that the end of the dial shaft 402 passes over the bolt 30, that is, the lock is unlocked. The rotatable knob 10 can be rotated within a set angle to achieve other functions.

Figure 16:
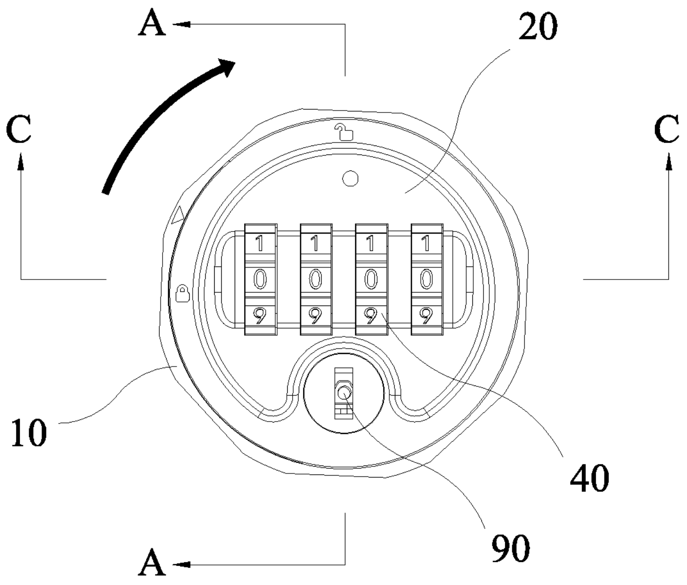
FIG. 16 is a front view of the preferred embodiment of the present invention in an automatic password resetting state.
Figure 17:
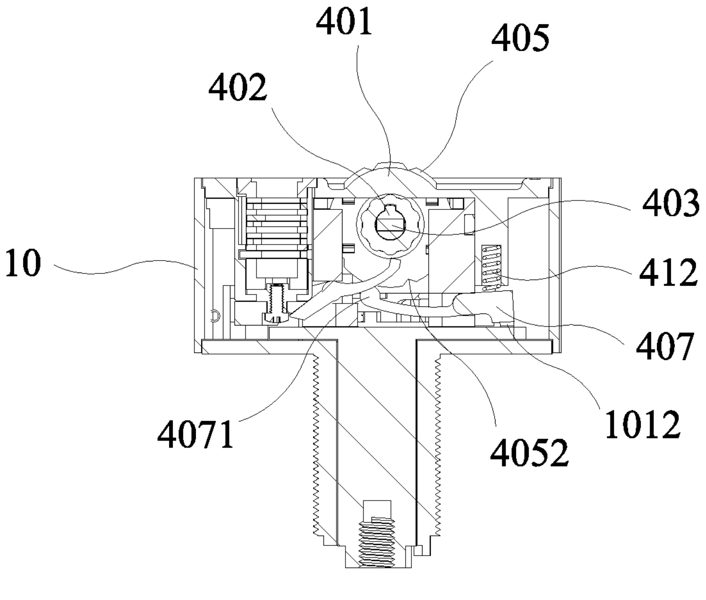
FIG. 17 is a cross-sectional view taken along line A-A of FIG. 16.
Figure 18:
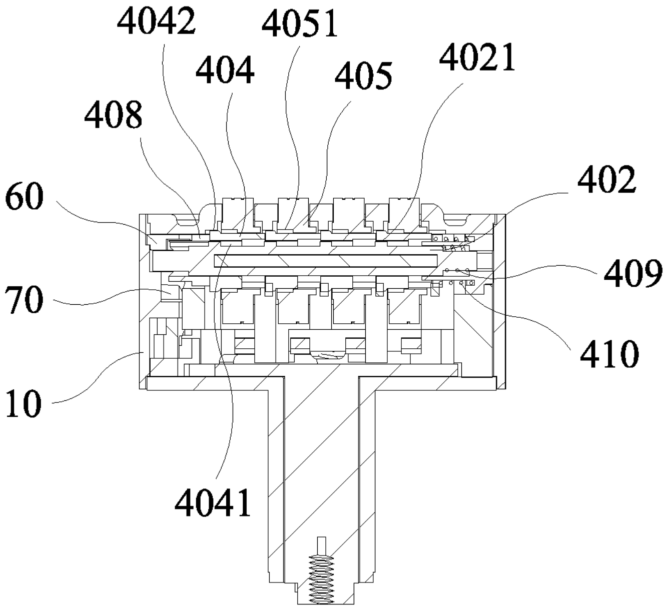
FIG. 18 is a cross-sectional view taken along line C-C of FIG. 16.

Automatic password resetting: As shown in FIGS. 16-18, after the end of the dial shaft 402 passes over the bolt 30, the protection frame 408 extends out of the base 401 under the action of the protection frame spring 410 and moves along the upper rail 60. The protection frame 408 drives the restricting protrusions 4042 of the bushings 404 to disengage from the restricting grooves 4051 of the dials 405, and presses the lower rail 70 to move down simultaneously. At this time, the rotation of the rotatable knob 10 enables the unlocking lug 1012 to be in contact with the positioning member 407, so that the pawls 4071 are disengaged from the disengaging grooves 4052. The dials 405 rotates relative to the bushings 404 under the interaction of the resetting magnet 403 and the dial magnets 406 (not shown in the figure, referring to FIG. 11) to achieve automatic password resetting. As the rotatable knob 10 continues to rotate, the positioning member 407 is disengaged from the unlocking lug 1012 again and is reset to lock the dials 405 under the action of the positioning member spring 412.

Figure 19:
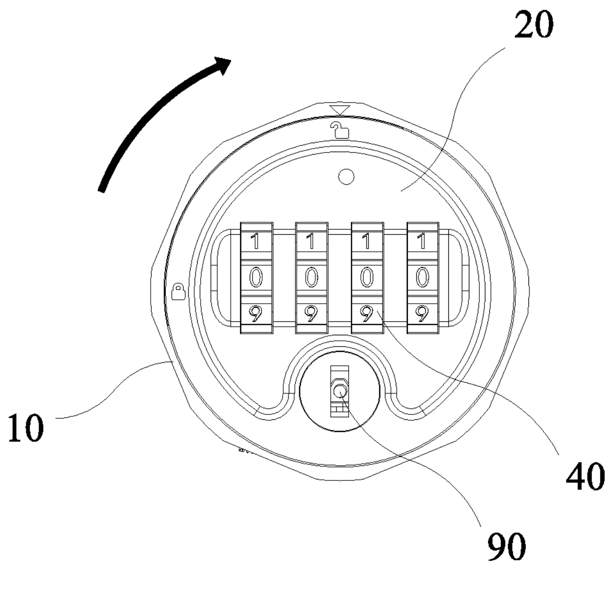
FIG. 19 is a front view of the preferred embodiment of the present invention in a manual password setting state.

Manual password setting: When the rotatable knob 10 is rotated to be in a fully open state as shown in FIG. 19, the lower rail 70 is reset under the action of the rail spring 80. The user can set the password manually by turning the dials 405.

Figure 20:
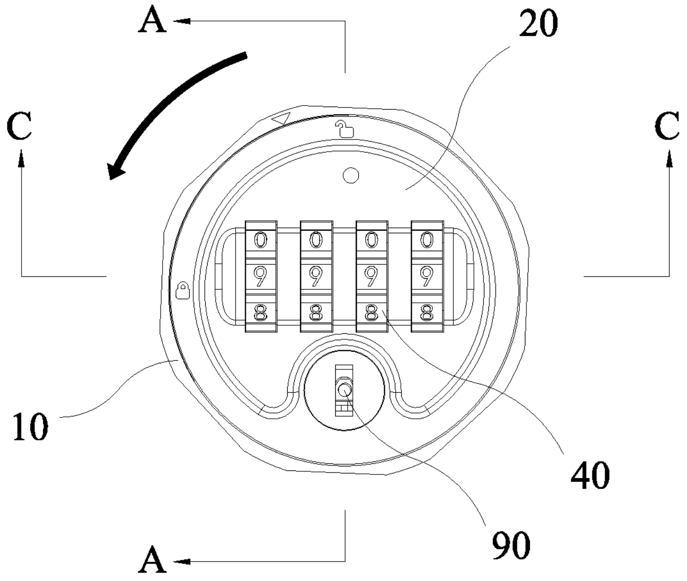
FIG. 20 is a front view of the preferred embodiment of the present invention in an automatic dial position resetting state.
Figure 21:
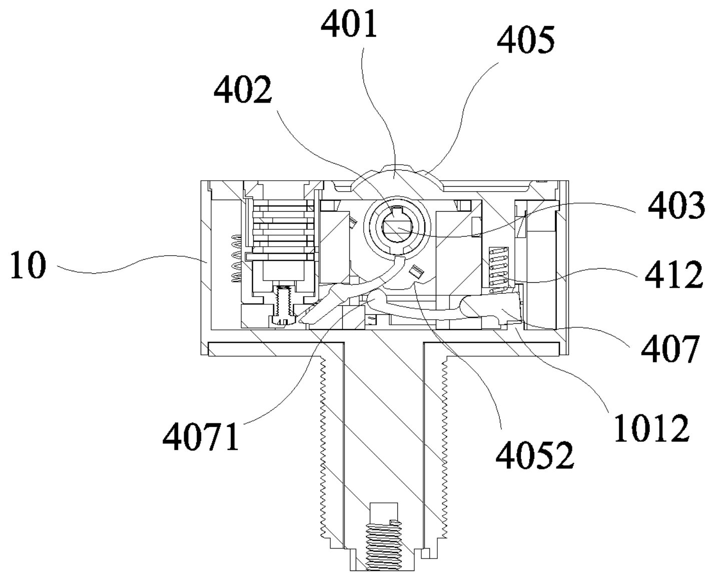
FIG. 21 is a cross-sectional view taken along line A-A of FIG. 20.
Figure 22:
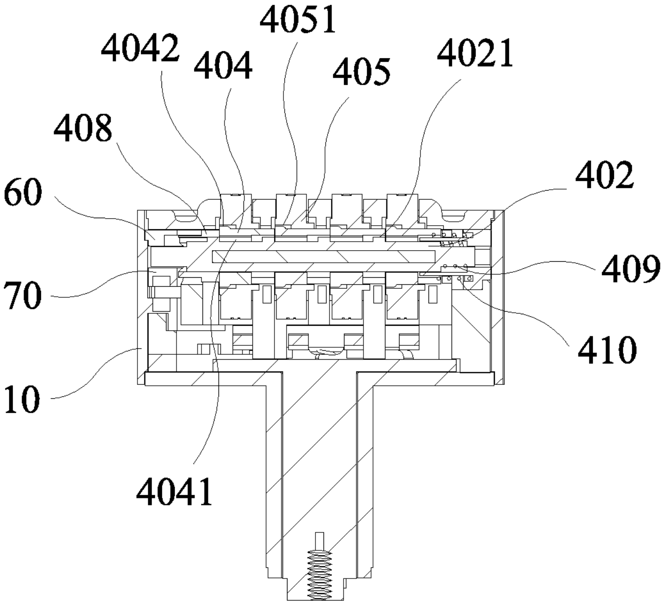
FIG. 22 is a cross-sectional view taken along line C-C of FIG. 20.

Dial position resetting when locked: Referring to FIGS. 20 to 22, after the user has finished setting the password, the rotatable knob 10 is turned reversely. The protection frame 408 moves along the upper rail 60 to overcome the elastic force of the protection frame spring 410, so that the dials 405 are coupled with the respective bushings 404. After the first raised blocks 4021 are disengaged from the first engaging grooves 4041, the positioning member 407 is displaced under the action of the unlocking lug 1012, so that the positioning member 407 is disengaged from the dials 405. The dials 405 rotate under the action of the magnetic force to achieve automatic dial position resetting when locked. The positioning member 407 is disengaged from the unlocking lug 1012, and is reset to lock the dials 405 under the action of the positioning member spring 412.

Figure 23:
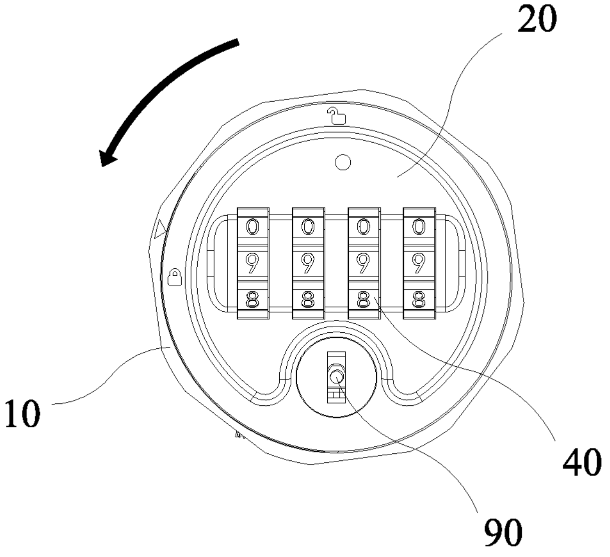
FIG. 23 is a front view of the preferred embodiment of the present invention in a locked state.
Figure 24:
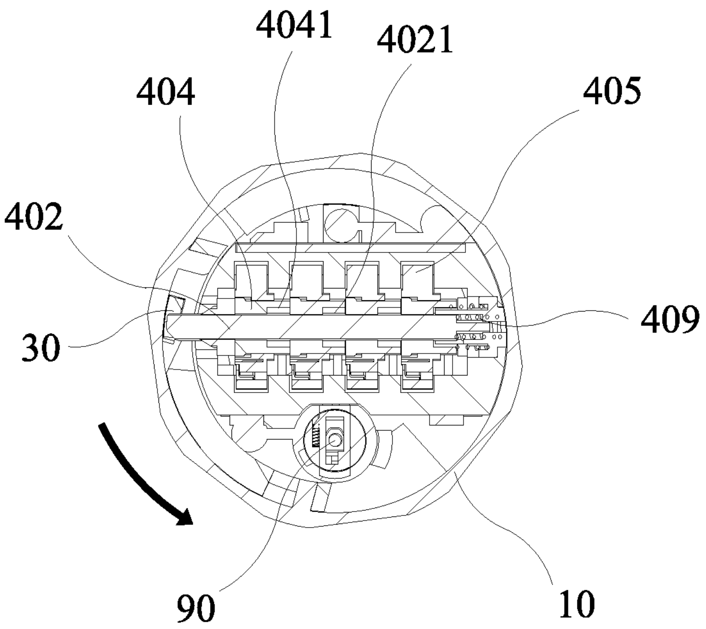
FIG. 24 is a structural schematic view of the preferred embodiment of the present invention in a locked state.

Locking: Referring to FIG. 23 and FIG. 24, after the dials are locked and reset, the rotatable knob 10 continues to rotate, the dial shaft 402 presses the bolt 30, and the bolt 30 retracts. After the dial shaft 402 passes over the bolt 30, the bolt 30 is reset under the action of the bolt spring 50 (not shown in the figure, referring to FIG. 2) to restrict the rotation of the rotatable knob 10 to achieve locking.

Unlocking using a key: When the correct key is inserted in the lock cylinder 90 and rotated, the lock cylinder 90 drives the drive block 200 to rotate, the drive block 200 pushes the push block 100, and the push block 100 pushes the bolt 30 to retract. At this time, the circumferential restriction between the dial shaft 402 and the bolt 30 is cancelled, and the lock can be unlocked by rotating the rotatable knob 10.

Figure 25:
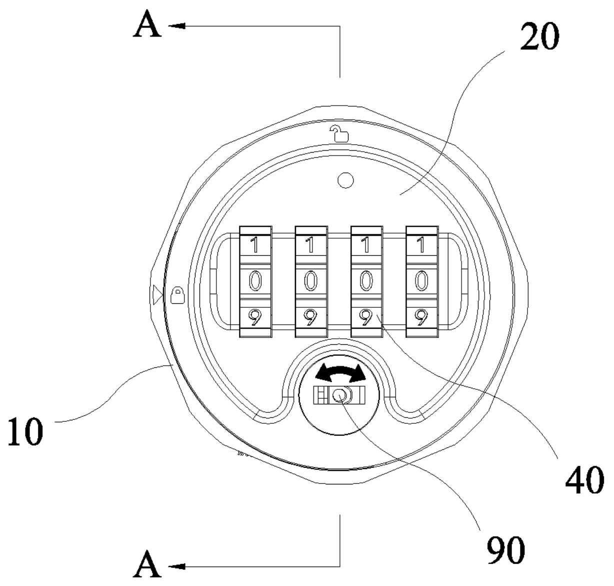
FIG. 25 is a front view of the preferred embodiment of the present invention in a state of using a key to look for the password.
Figure 26:
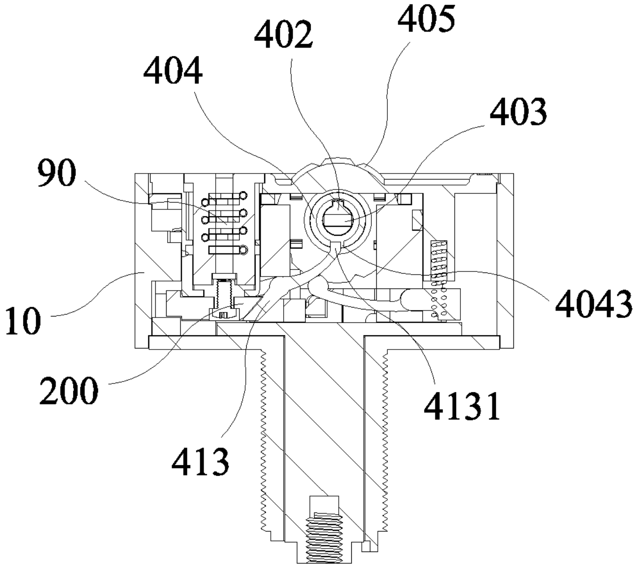
FIG. 26 is a cross-sectional view taken along line A-A of FIG. 25.

Looking for the password using a key: Referring to FIG. 25 and FIG. 26, the correct key is rotated to rotate the lock cylinder 90. (Generally speaking, the key is rotated in a reverse direction different from the unlocking direction, so as to distinguish the operation of different functions). The lock cylinder 90 drives the drive block 200 to rotate. The drive block 200 drives the probe member 413 to rotate for the probes 4131 to be fitted on the surfaces of the bushings 404. When the dials 405 are turned until the password is correct, the probes 4131 are inserted in the probe grooves 4043 to restrict the rotation of the bushings 404. (At this time, the bushings 404 are coupled with the dials 405, and both are relatively stationary.) If the dials 405 cannot be turned again, it means that the correct password has been got.

Through the above structure, in the present invention, the bushings 404 and the dials 405 are separated during the relative rotation of the rotatable knob 10 and the panel 20 by providing the protection frame 408, in cooperation with the resetting magnet 403 and the dial magnets 406 to realize automatic password resetting. The product is a one-time temporary password each time it is used. The product uses one-time temporary password every time it is used. The password is set by the user, which reduces the risk that the password is exposed and lost. Besides, the resetting magnet 403 and the dial magnets 406 also have the function of automatic dial position resetting, which can prevent the user from forgetting to scramble the password when the lock is locked Finally, the product of the present invention has the functions of automatic password resetting and automatic dial position resetting when locked, is suitable for places with large population flow, is easy to manage, and has high safety performance.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. A combination lock, comprising:

a rotatable knob that is rotatable relative to a panel, the rotatable knob having an accommodation chamber, the panel being pivotally connected to the accommodation chamber;

a bolt, mounted to a side wall of the accommodation chamber; and a dial assembly; including:

a base having a movement chamber, the base being mounted to the panel and located in the accommodation chamber;

a dial shaft, passing through the movement chamber and being movable axially relative to the movement chamber, in cooperation with the bolt to realize unlocking and locking;

a plurality of sets of bushings and dials, the bushings being sleeved on the dial shaft and being selectively stationary or rotatable relative to the dial shaft along with axial movement of the dial shaft, the dials being disposed corresponding to the bushings and selectively rotating together with the bushings or rotating relative to the bushings;

a position resetting mechanism, configured to reset the dials;

a positioning member, mounted to the base and disposed opposite to the dials for restricting resetting of the dials;

a protection frame, mounted to the base, the protection frame being movable axially relative to the base for changing the dials to rotate together with the bushings or to rotate relative to the bushings;

wherein relative rotation of the rotatable knob and the panel drives the dial shaft and the protection frame to move axially and enables the positioning member to restrict or unlock rotation of the dials so that the rotatable knob can be rotated relative to the panel to a first position, a second position, a third position, or a fourth position;

in the first position, the dial shaft cannot move and is mutually restricted with the bolt, when a password is correct, the bushings can rotate relative to the dial shaft, the dials can rotate together with the bushings, and the positioning member restricts resetting of the dials;

in the second position, the bushings are stationary relative to the dial shaft, the dials can rotate relative to the bushings, and the positioning member doesn't restrict resetting of the dials, so as to achieve automatic password resetting;

in the third position, the bushings can rotate relative to the dial shaft, the dials can rotate together with the bushings, and the positioning member doesn't restrict resetting of the dials, so as to achieve automatic dial position resetting;

in the fourth position, the bushings being stationary relative to the dial shaft, the dials can rotate relative to the bushings, and the positioning member restricts resetting of the dials, so as to achieve manual password setting.

2. The combination lock as claimed in claim 1, wherein the position resetting mechanism further includes dial magnets and a resetting magnet, the dial magnets are disposed corresponding to the dials, and the resetting magnet is configured to attract the dial magnets for resetting the dials.

3. The combination lock as claimed in claim 2, wherein the dial magnets are arranged in pairs, the dial magnets with opposite poles is disposed on each dial, and the resetting magnet is arranged along an axial direction of the dial shaft and is mounted to the dial shaft.

4. The combination lock as claimed in claim 2, wherein the position resetting mechanism further includes an acceleration magnet, and the acceleration magnet is mounted to the base and is arranged in parallel with the resetting magnet.

5. The combination lock as claimed in claim 1, wherein an outer circumference of the dial shaft has a plurality of first raised blocks, the bushings correspond to the first raised blocks one by one, an inner wall of each of the bushings is formed with a first engaging groove opposite to a corresponding one of the first raised blocks, and the corresponding first raised block is movably fitted in the first engaging groove along with axial movement of the dial shaft.

6. The combination lock as claimed in claim 1, wherein an outer circumference of each of the bushings has a plurality of restricting protrusions arranged at equal intervals, an inner wall of each of the dials has restricting grooves corresponding in position to the restricting protrusions, and the restricting protrusions are movably fitted in the restricting grooves.

7. The combination lock as claimed in claim 1, wherein a side wall of the movement chamber is formed with dial grooves corresponding to the respective dials, and the dial grooves are configured to make way for the dials to rotate and prevent the dials from moving axially in the movement chamber.

8. The combination lock as claimed in claim 7, wherein the dial assembly further includes a dial shaft spring and a protection frame spring disposed at one end of the dial shaft, away from the bolt, to provide an elastic force for the dial shaft and the protection frame to move axially; the dial assembly further includes a spring mounting seat, the spring mounting seat is disposed between the end of the dial shaft away from the bolt and the side wall of the accommodation chamber, and both the dial shaft spring and the protection frame spring are mounted to the spring mounting seat.

9. The combination lock as claimed in claim 1, wherein both ends of the protection frame are sleeved on the dial shaft and abut against the bushings at both ends of an inner side of the protection frame, so that the protection frame can drive the bushings to move.

10. The combination lock as claimed in claim 1, wherein the first position, the fourth position, the second position and the third position are arranged in sequence, so that the rotatable knob is rotated relative to the panel to achieve functions of unlocking, automatic password resetting and manual password setting in turn when unlocked and to achieve a function of automatic dial position resetting when locked.

11. The combination lock as claimed in claim 10, further comprising a bolt spring, the side wall of the accommodation chamber having a rotation rail, the bolt being mounted at one end of the rotation rail and movable in a direction perpendicular to the rotation rail, the bolt spring being disposed between the bolt and a bottom of the accommodation chamber, one end of the dial shaft being movably fitted between both ends of the rotation rail, one end of the rotation rail, close to the bolt, being defined as the first position, the other end of the rotation rail, away from the bolt, being defined as the third position.

12. The combination lock as claimed in claim 11, wherein two sides of the bolt have an unlocking slope and a locking slope respectively; the unlocking slope faces an unlocking direction of the dial shaft, so that the bolt provides a component force for moving the dial shaft axially along with rotation of the rotatable knob; the locking slope faces a locking direction of the dial shaft, so that the dial shaft provides a component force for lowering the bolt along with rotation of the rotatable knob.

13. The combination lock as claimed in claim 11, further comprising an upper rail, a lower rail and a rail spring installed on the side wall of the accommodation chamber, the upper rail and the lower rail being arranged opposite to each other to form the rotation rail; an inner side of the upper rail having a first receiving groove for the protection frame to move axially, a slide slope being connected between the first receiving groove and the inner side of the upper rail, the slide slope being disposed between the first position and the second position; the lower rail being disposed opposite to the first receiving groove; the rail spring being disposed between the lower rail and the bottom of the accommodation chamber; one end of the lower rail, close to the bolt, having a press slope, wherein when the protection frame is moved axially to lean against the press slope, the lower rail presses down the rail spring to make way for the protection frame.

14. The combination lock as claimed in claim 13, wherein an outer circumference of the lower rail has a second raised block, an inner wall of the accommodation chamber has a second engaging groove, and the second raised block is inserted into the second engaging groove to restrict circular movement of the lower rail on the inner wall of the accommodation chamber.

15. The combination lock as claimed in claim 1, wherein the dial assembly further includes a positioning member spring; the positioning member is pivotally connected to the base, one side of the positioning member has pawls corresponding to the dials, a third engaging groove is defined between every adjacent two of code words of each of the dials, the pawls are opposite to the third engaging grooves of the dials, respectively; the positioning member spring is disposed between another side of the positioning member and the base to provide an elastic force to drive the positioning member to rotate for the pawls to be engaged in the third engaging grooves of the dials, respectively; a bottom of the accommodation chamber has an unlocking lug, the unlocking lug is opposite to the another side of the positioning member, the positioning member movably cooperates with the unlocking lug along with rotation of the rotatable knob, when the positioning member is in contact with the unlocking lug, the pawls are disengaged from the third engaging grooves of the dials, and the unlocking lug is located between the second position and the third position.

16. The combination lock as claimed in claim 1, further comprising a lock cylinder and a link assembly, the lock cylinder being mounted to the panel and inserted in the accommodation chamber, the link assembly being disposed at an inner end of the lock cylinder and being opposite to the bolt;

wherein when a correct key is inserted in the lock cylinder, the lock cylinder is rotated to drive the bolt to move through the link assembly, so as to unlock the dial shaft.

17. The combination lock as claimed in claim 16, wherein the link assembly includes a push block and a drive block, the push block is slidably fitted at a bottom of the accommodation chamber and is movable along a circumferential direction of the accommodation chamber, the push block has a second receiving groove to make way for the rail spring; the drive block is mounted to the inner end of the lock cylinder and configured to drive the push block to move along with rotation of the lock cylinder.

18. The combination lock as claimed in claim 17, wherein one end of the push block, close to the bolt, has a first downward pressing slope, the first downward pressing slope faces the bolt and is inclined toward the bottom of the accommodation chamber to provide a component force for pressing the bolt downward, the bolt has a second downward pressing slope opposite to the first downward pressing slope, and the first downward pressing slope is slidably fitted with the second downward pressing slope.

19. The combination lock as claimed in claim 16, wherein the dial assembly further includes a probe member, the probe member is pivotally connected to the base, one side of the probe member has a plurality of probes corresponding to the respective bushings, each of the bushings has a probe groove corresponding to a corresponding one of the probes; when the lock cylinder is rotated, the drive block drives the probe member to rotate for the probes to be in contact with surfaces of the respective bushings, when the password is correct, the probes are inserted into the probe grooves of the bushings, respectively.

20. The combination lock as claimed in claim 1, further comprising a bottom plate and a lock member, a locking end of the rotatable knob having a rotating shaft, the bottom plate having a shaft hole, the rotating shaft passing through the shaft hole and being connected to the lock member, the bottom plate being connected to the panel.

21. The combination lock as claimed in claim 20, wherein the panel has at least one connecting post, a bottom of the accommodation chamber is formed with an arc-shaped hole, the connecting post is fitted in the accommodation chamber and passes through the arc-shaped hole, when the rotatable knob is rotated relative to the panel, the arc-shaped hole is configured to make way for circular movement of the connecting post, and a top end of the connecting post is connected to the bottom plate.

* * * * *